(12) United States Patent
Dipilato

(10) Patent No.: US 7,959,424 B2
(45) Date of Patent: Jun. 14, 2011

(54) TYRE CURING MOLD

(75) Inventor: Roberto Dipilato, Grottaferrata (IT)

(73) Assignee: Bridgestone Corporation, Tokyo (JP)

( * ) Notice: Subject to any disclaimer, the term of this patent is extended or adjusted under 35 U.S.C. 154(b) by 185 days.

(21) Appl. No.: 12/309,353

(22) PCT Filed: Jul. 19, 2007

(86) PCT No.: PCT/EP2007/057479
§ 371 (c)(1),
(2), (4) Date: Jun. 23, 2009

(87) PCT Pub. No.: WO2008/009724
PCT Pub. Date: Jan. 24, 2008

(65) Prior Publication Data
US 2010/0009020 A1 Jan. 14, 2010

(30) Foreign Application Priority Data
Jul. 19, 2006 (IT) .............................. TO2006A0532

(51) Int. Cl.
*B29C 35/02* (2006.01)
(52) U.S. Cl. ........................................... 425/46; 425/38
(58) Field of Classification Search .................... 425/37, 425/38, 46, 806; 264/276, 328.9
See application file for complete search history.

(56) References Cited

U.S. PATENT DOCUMENTS

| 3,096,541 | A | * | 7/1963 | Sindelar ........................ 425/37 |
| 4,013,390 | A | | 3/1977 | Moeller et al. |
| 4,655,699 | A | * | 4/1987 | Collier .......................... 425/46 |
| 4,740,145 | A | | 4/1988 | Shurman |
| 5,269,669 | A | | 12/1993 | Ladouce |
| 5,769,976 | A | * | 6/1998 | Omokawa et al. ............. 425/47 |
| 2004/0018262 | A1 | * | 1/2004 | Reep et al. ..................... 425/35 |

FOREIGN PATENT DOCUMENTS

| DE | 25 02 185 | 7/1976 |
| EP | 0 522 374 A1 | 1/1993 |
| JP | A-2003-71843 | 3/2003 |
| JP | A-2006-168253 | 6/2006 |
| WO | WO 2004/009337 A1 | 1/2004 |
| WO | WO 2005/115710 A1 | 12/2005 |

* cited by examiner

*Primary Examiner* — James Mackey
(74) *Attorney, Agent, or Firm* — Oliff & Berridge, PLC

(57) ABSTRACT

A curing mold for a tire. The curing mold is in the form of a hollow cylinder, and has two parallel opposite sidewalls defining the base walls of the curing mold and having respective inner retaining surfaces; and a number of lateral sectors arranged successively to define the cylindrical lateral wall of the curing mold. Each sidewall has at least one seat formed through the inner retaining surface, at the outer edge of the inner retaining surface; a movable member housed inside the seat and movable between an extracted position, in which the movable member projects at least partly from the seat, and a withdrawn position, in which the movable member is housed completely inside the seat; and at least one elastic push member for pushing the movable member out of the seat into the extracted position.

11 Claims, 3 Drawing Sheets

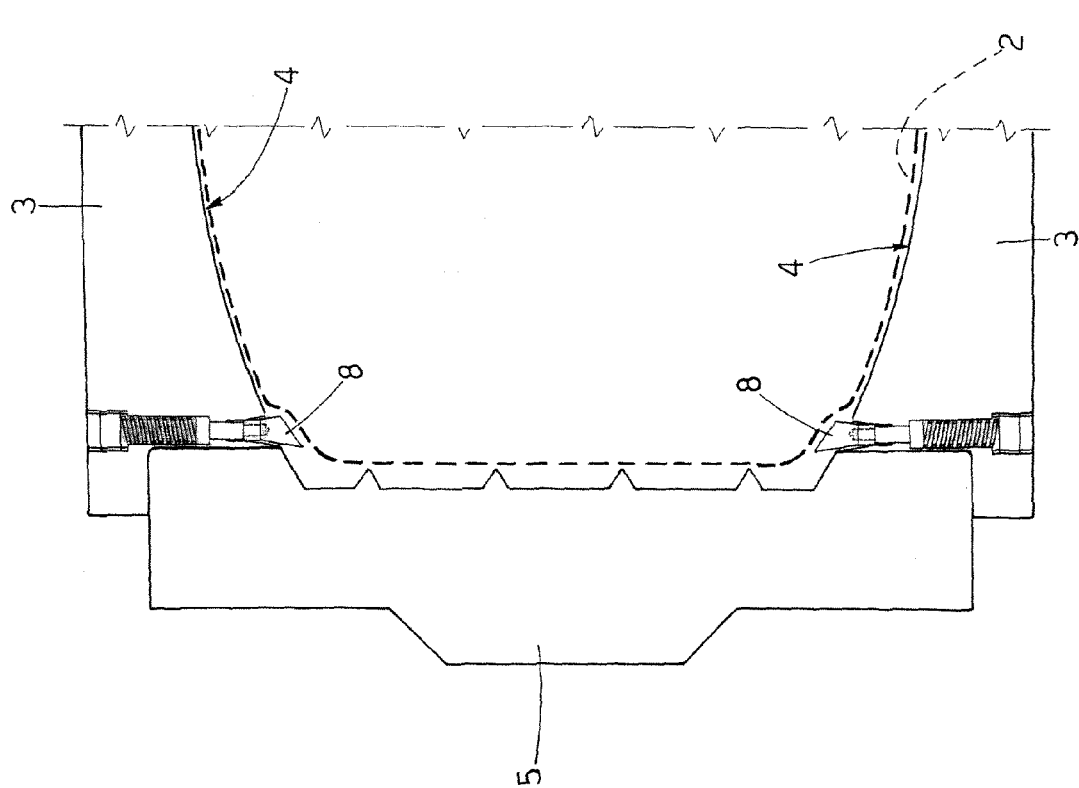

TYRE CURING MOLD

TECHNICAL FIELD

The present invention relates to a tyre curing mold.

BACKGROUND ART

A tyre curing mold is in the form of a hollow cylinder, and comprises two opposite, parallel, flat circular sidewalls defining the base walls of the mold; and a number of lateral sectors arranged successively to form the cylindrical lateral wall of the mold.

To insert a green tyre inside the mold and remove the cured tyre from the mold, the lateral sectors are movable radially to and from an engaged position contacting the sidewalls, and are normally pushed radially towards the sidewalls by a system of inclined surfaces activated by a press. This solution is adopted in that it provides for gripping the lateral sectors against the sidewalls with considerable force corresponding to a pressure of 25-30 bars necessary to counteract the pressure (normally at least 20 bars) generated inside the mold during the curing operation.

One example of a tyre curing mold of the above type is described in Patent Application WO2004009337A1.

Because of inevitable tolerances encountered particularly in tyre manufacturing, a surplus portion of the tyre is sometimes pinched between a sidewall and one or more lateral sectors, thus resulting in the formation, on the sidewall of the tyre, of long, circular, extremely thin flash, which tends to curl and is often tough to remove by adhering firmly to the sidewall of the tyre.

Flash in no way affects tyre performance, but, being unsightly, affects the marketability of the tyre and must therefore be removed by further processing, thus increasing the manufacturing cost of the tyre.

Moreover, flash residue on the sidewalls and lateral sectors of the mold must be removed thoroughly, by comprising very hard, cured (bakelized) rubber, which, with repeated closure of the mold, could eventually result in damage to the mold itself. Needless to say, this mold cleaning operation also increases the manufacturing cost of the tyre.

U.S. Pat. No. 4,740,145A1 describes a tyre curing mold, in which flash is prevented by a number of blowholes, which, by blowing on the green tyre, prevent it from being "pinched" between the sidewalls and lateral sectors. Using blowholes, however, is fairly complex, by requiring a compressed air source and, above all, regular cleaning of the blowholes to prevent clogging by rubber scale. Moreover, at the curing stage, the high pressure inside the curing mold may force the tyre rubber partly inside the blowholes, thus resulting in the formation of unsightly "hair" on the tyre.

DISCLOSURE OF THE INVENTION

It is an object of the present invention to provide a tyre curing mold designed to eliminate the aforementioned drawbacks, and which, in particular, is cheap and easy to produce.

According to the present invention, there is provided a tyre curing mold as claimed in the accompanying Claims.

BRIEF DESCRIPTION OF THE DRAWINGS

A non-limiting embodiment of the present invention will be described by way of example with reference to the accompanying drawings, in which:

FIG. 4 shows the FIG. 1 mold housing a green tyre for curing.

PREFERRED EMBODIMENTS OF THE INVENTION

Figure 1:
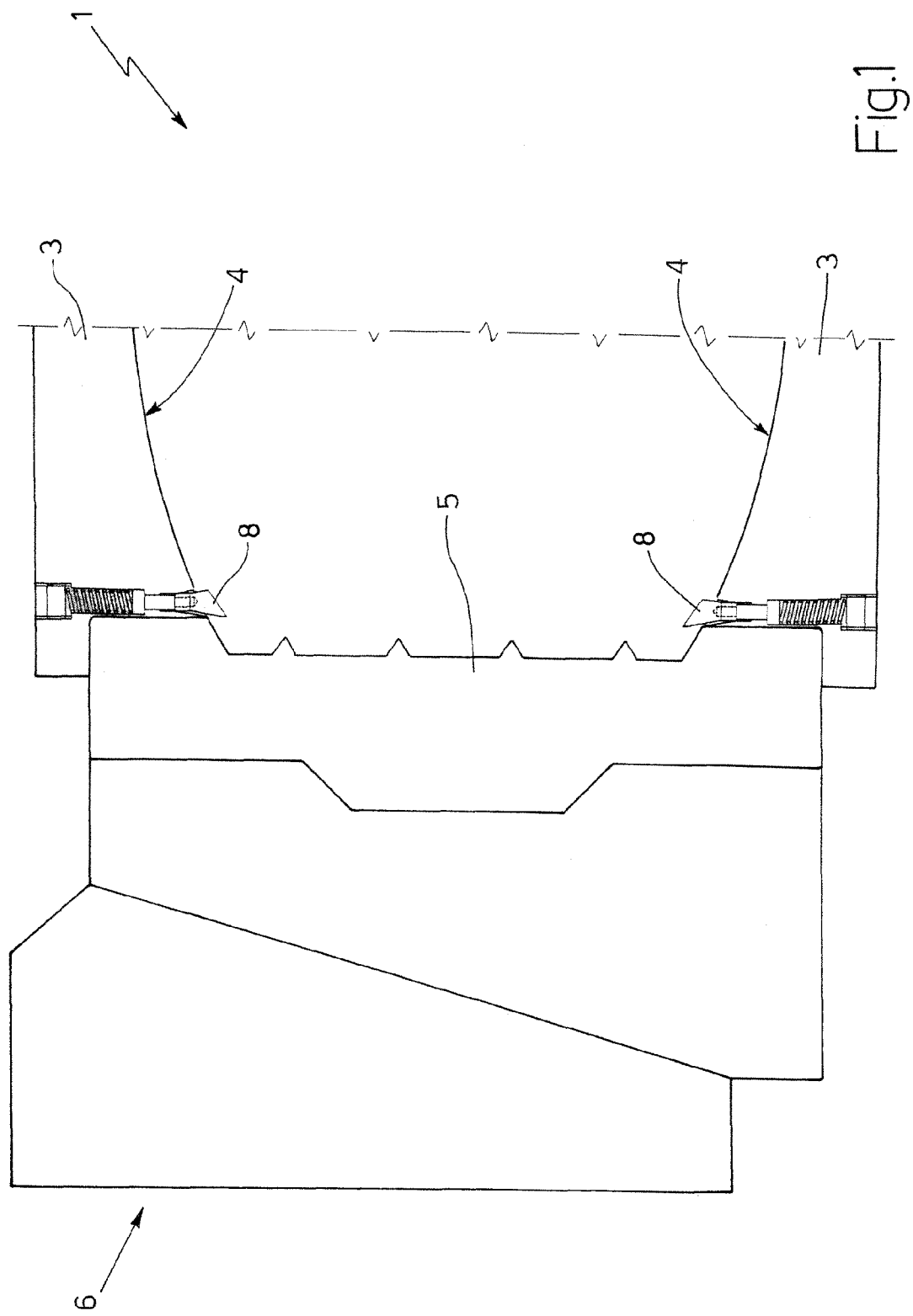
FIG. 1 shows a schematic lateral section, with parts removed for clarity, of a tyre curing mold in accordance with the present invention.

Number 1 in FIG. 1 indicates as a whole a mold for curing a tyre 2 (shown by the dash line in FIG. 4).

Curing mold 1 is in the form of a hollow cylinder, and comprises two opposite parallel sidewalls 3 defining the base walls of curing mold 1 and having respective inner retaining surfaces 4 contacting a tyre 2 housed inside the mold. Curing mold 1 also comprises a number of (normally 8 or 9) lateral sectors 5 (only one shown in FIG. 1) arranged successively to define the cylindrical lateral wall of the mold, and movable radially to and from the two sidewalls 3.

Lateral sectors 5 are pushed radially towards sidewalls 3 by a system 6 of inclined surfaces activated by a press (not shown). This solution is adopted in that it provides for gripping lateral sectors 5 against sidewalls 3 with considerable force corresponding to a pressure of 25-30 bars necessary to counteract the pressure (normally at least 20 bars) generated inside mold 1 during the curing operation.

Figure 2:
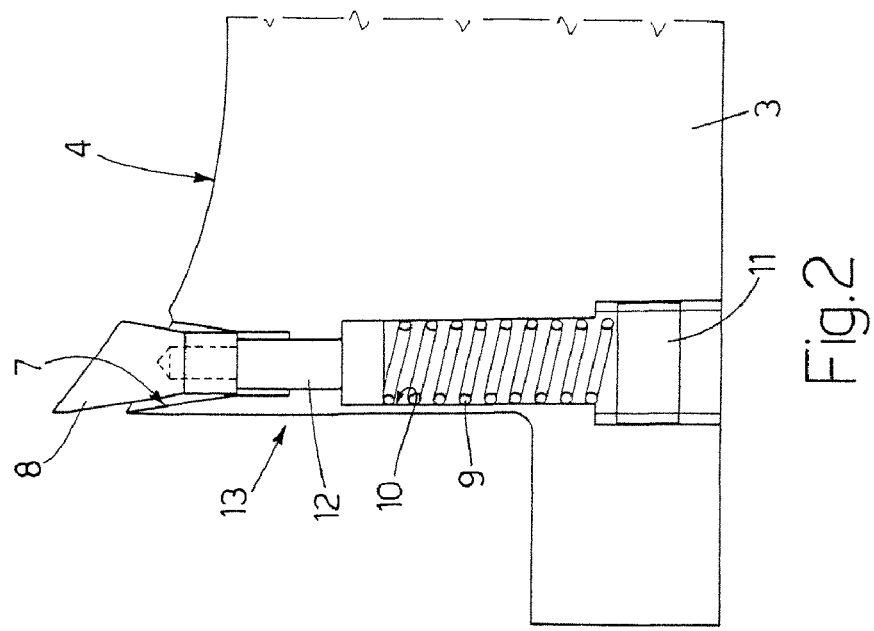
FIG. 2 shows a larger-scale detail of the FIG. 1 mold in an extracted position.
Figure 3:
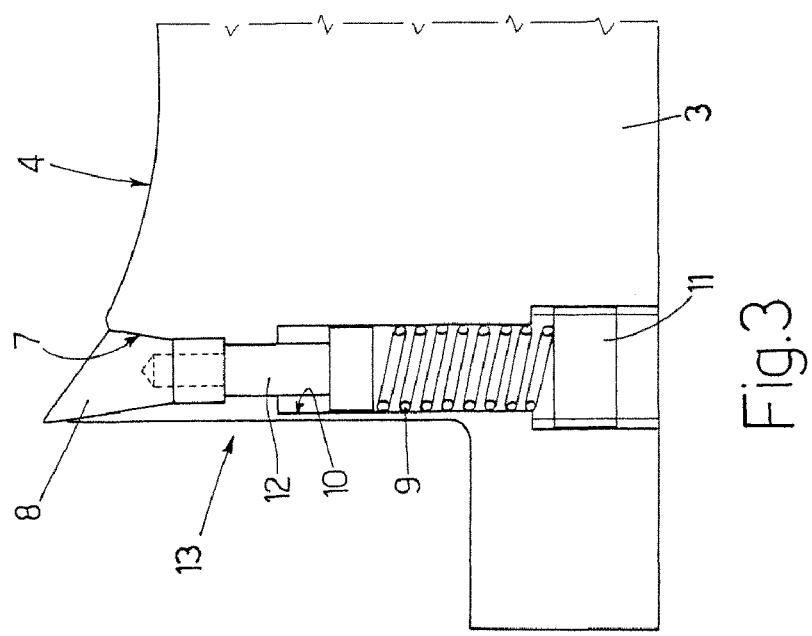
FIG. 3 shows the FIG. 2 detail in a withdrawn position.

As shown in FIGS. 2 and 3, each sidewall 3 comprises an annular seat 7 formed through inner retaining surface 4, at the outer edge of inner retaining surface 4. Each seat 7 houses an annular movable member 8, which is movable inside seat 7 between an extracted position (FIG. 2), in which movable member 8 projects partly from seat 7, and a withdrawn position (FIG. 3), in which movable member 8 is housed completely inside seat 7. Movable member 8 is pushed out of seat 7 into the extracted position with a given force by push means. In a preferred embodiment, the push means are elastic, and comprise a number of (e.g. twelve) springs 9 equally spaced along movable member 8. In an alternative embodiment not shown, the push means comprise one or more hydraulic, pneumatic, or electric actuators.

In a preferred embodiment, the outer wall of each movable member 8 is shaped to blend seamlessly with inner retaining surface 4 when movable member 8 is in the withdrawn position, so that, in the withdrawn position, each movable member 8 in no way alters the normal contour of inner retaining surface 4.

Each spring 9 is housed inside a partly threaded through hole 10 formed through seat 7, and is compressed between an adjusting pin 11 screwed inside a threaded portion of through hole 10, and a transmission body 12 (more specifically, a screw) screwed to movable member 8. Screwing or unscrewing each adjusting pin 11 obviously adjusts the position of adjusting pin 11 along through hole 10 and therefore the force exerted by spring 9 on movable member 8.

Through hole 10 has a constriction 13 defining two stops, in turn defining the extracted and withdrawn positions of movable member 8. For example, to move from the withdrawn position to the extracted position, movable member 8 may travel a distance ranging between 1 and 10% of the width of tyre 2. For example, in the case of a car tyre, movable member 8 may travel approximately 5 mm.

As shown in FIG. 4, when curing mold 1 is closed about a tyre 2, i.e. when lateral sectors 5 are pushed onto sidewalls 3, the two movable members 8 are pushed by springs 9 into the extracted position, so that, at the mold parting line between lateral sectors 5 and sidewalls 3, tyre 2 is kept well away from the join between lateral sectors 5 and sidewalls 3, and so prevented from being pinched between lateral sectors 5 and sidewalls 3.

When curing mold 1 is pressurized (e.g. to a pressure of about 20-22 bars), the expansion force on tyre 2 amply overcomes the force exerted by springs 9 and so pushes the two movable members 8 into the withdrawn position. It should be pointed out that the thrust exerted by springs 9 on each movable member 8 must, obviously, be less than the expansion force exerted on tyre 2 when curing mold 1 is pressurized.

In various embodiments not shown, the form and/or number of movable members 8 or springs 9 may differ.

Curing mold 1 as described above has numerous advantages, by being mechanically straightforward, cheap and easy to produce, and preventing the formation of flash. It is important to note that an existing curing mold 1, with no movable members 8, need not necessarily be scrapped, and can be equipped with movable members 8 with only a few minor mechanical alterations.

The invention claimed is:

1. A curing mold for a tyre; the curing mold is in the form of a hollow cylinder, and comprises:
   two parallel opposite sidewalls defining the base walls of the curing mold and having respective inner retaining surfaces contacting a tyre housed inside the curing mold; and
   a number of lateral sectors arranged successively to define the cylindrical lateral wall of the curing mold, and movable radially to and from the two sidewalls;
   wherein each sidewall comprises:
   at least one seat formed through the inner retaining surface, at the outer edge of the inner retaining surface;
   a movable member housed inside the seat and movable between an extracted position, in which the movable member projects at least partly from the seat, and a withdrawn position, in which the movable member is housed completely inside the seat; and
   push means for pushing the movable member out of the seat into the extracted position with a given force.

2. A curing mold as claimed in claim 1, wherein the seats and the movable members are annular.

3. A curing mold as claimed in claim 1, wherein the outer wall of each movable member is shaped to blend seamlessly with the inner retaining surface when the movable member is in the withdrawn position.

4. A curing mold as claimed in claim 1, wherein the extracted and withdrawn positions of each movable member are determined by respective stops.

5. A curing mold as claimed in claim 1, wherein the push means of each movable member are elastic.

6. A curing mold as claimed in claim 5, wherein the push means of each movable member comprise a number of springs, each housed in a respective through hole formed through the seat.

7. A curing mold as claimed in claim 6, wherein each through hole is partly threaded, and houses an adjusting pin; and each spring is compressed between the adjusting pin and the movable member.

8. A curing mold as claimed in claim 6, wherein each through hole has a constriction to define two stops defining the extracted and withdrawn positions of the movable member.

9. A curing mold as claimed in claim 8, wherein each movable member is connected mechanically to each spring by a transmission body resting at one end on the spring, and screwed at the opposite end to the movable member.

10. A curing mold as claimed in claim 1, wherein, to move from the withdrawn position to the extracted position, each movable member travels a distance ranging between 1 and 10% of the width of the tyre.

11. A curing mold as claimed in claim 1, wherein the thrust exerted by the push means on each movable member is less than the expansion force acting on a tyre housed inside the curing mold when the curing mold is pressurized.

* * * * *